United States Patent
Habusha et al.

(10) Patent No.: US 9,037,810 B2
(45) Date of Patent: May 19, 2015

(54) PRE-FETCHING OF DATA PACKETS

(75) Inventors: Adi Habusha, Haifa (IL); Alon Pais, D.N. Shimshon (IL); Rabeeh Khoury, Tarshiha (IL)

(73) Assignee: Marvell Israel (M.I.S.L.) Ltd., Yokneam (IL)

( * ) Notice: Subject to any disclaimer, the term of this patent is extended or adjusted under 35 U.S.C. 154(b) by 215 days.

(21) Appl. No.: 13/038,258

(22) Filed: Mar. 1, 2011

(65) Prior Publication Data

US 2011/0219195 A1   Sep. 8, 2011

Related U.S. Application Data

(60) Provisional application No. 61/309,804, filed on Mar. 2, 2010.

(51) Int. Cl.
- G06F 12/00 (2006.01)
- G06F 12/08 (2006.01)
- G06F 12/12 (2006.01)

(52) U.S. Cl.
CPC ............ *G06F 12/08* (2013.01); *G06F 12/0859* (2013.01); *G06F 12/121* (2013.01); *G06F 12/12* (2013.01)

(58) Field of Classification Search
None
See application file for complete search history.

(56) References Cited

U.S. PATENT DOCUMENTS

| | | | |
|---|---|---|---|
| 4,574,351 A | 3/1986 | Dang et al. | |
| 4,612,612 A | 9/1986 | Woffinden et al. | |
| 4,682,281 A | 7/1987 | Woffinden et al. | |
| 5,315,707 A | 5/1994 | Seaman et al. | |
| 5,657,471 A | 8/1997 | Lary et al. | |
| 5,860,149 A | 1/1999 | Fiacco et al. | |
| 6,009,463 A | 12/1999 | Brandt et al. | |
| 6,078,993 A | 6/2000 | Iwata et al. | |
| 6,112,265 A | 8/2000 | Harriman et al. | |
| 6,282,589 B1 | 8/2001 | Porterfield et al. | |
| 6,343,351 B1 | 1/2002 | Lackman et al. | |
| 6,378,052 B1 | 4/2002 | Genduso et al. | |
| 6,487,640 B1 | 11/2002 | Lipasti | |
| 6,647,423 B2 | 11/2003 | Regnier et al. | |
| 6,654,860 B1 | 11/2003 | Strongin et al. | |
| 6,918,005 B1 | 7/2005 | Marchant et al. | |

(Continued)

FOREIGN PATENT DOCUMENTS

| CN | 1226704 A | 8/1999 |
|---|---|---|
| CN | 1617107 A | 5/2005 |

(Continued)

OTHER PUBLICATIONS

Taylor et al., "System-onChip Packet Processor for an Experimental Network Services Platform", Globecom 2003, IEEE, pp. 3933-pp. 3937.

*Primary Examiner* — Matthew Bradley
*Assistant Examiner* — Arvind Talukdar

(57) ABSTRACT

Some of the embodiments of the present disclosure provide a method comprising receiving a data packet, and storing the received data packet in a memory; generating a descriptor for the data packet, the descriptor including information for fetching at least a portion of the data packet from the memory; and in advance of a processing core requesting the at least a portion of the data packet to execute a processing operation on the at least a portion of the data packet, fetching the at least a portion of the data packet to a cache based at least in part on information in the descriptor. Other embodiments are also described and claimed.

19 Claims, 5 Drawing Sheets

(56) References Cited

U.S. PATENT DOCUMENTS

| | | |
|---|---|---|
| 6,963,924 B1 * | 11/2005 | Huang et al. ............... 709/238 |
| 7,093,094 B2 | 8/2006 | Cismas |
| 7,234,039 B1 | 6/2007 | Righi et al. |
| 7,430,623 B2 | 9/2008 | Walls et al. |
| 7,600,131 B1 | 10/2009 | Krishna et al. |
| 7,664,938 B1 | 2/2010 | Tripathi et al. |
| 7,813,342 B2 | 10/2010 | Gadelrab |
| 7,818,389 B1 * | 10/2010 | Chiang et al. ............... 709/212 |
| 7,877,524 B1 * | 1/2011 | Annem et al. ............... 710/26 |
| 7,889,734 B1 * | 2/2011 | Hendel et al. ............... 370/392 |
| 7,930,451 B2 | 4/2011 | Chen et al. |
| 8,250,322 B2 | 8/2012 | Huang et al. |
| 2004/0184470 A1 | 9/2004 | Holden |
| 2004/0268044 A1 | 12/2004 | Heller, Jr. et al. |
| 2005/0021913 A1 | 1/2005 | Heller, Jr. |
| 2005/0193158 A1 * | 9/2005 | Srinivasan et al. ............ 710/300 |
| 2005/0198464 A1 | 9/2005 | Sokolov |
| 2005/0256976 A1 | 11/2005 | Susairaj et al. |
| 2005/0286513 A1 | 12/2005 | King |
| 2006/0004941 A1 | 1/2006 | Shah et al. |
| 2006/0026342 A1 | 2/2006 | Calvignac et al. |
| 2006/0045090 A1 | 3/2006 | Ronciak et al. |
| 2006/0179333 A1 | 8/2006 | Brittain et al. |
| 2006/0236063 A1 | 10/2006 | Hausauer et al. |
| 2006/0288134 A1 * | 12/2006 | Baker et al. ............... 710/52 |
| 2007/0081538 A1 | 4/2007 | Ganji |
| 2008/0005405 A1 | 1/2008 | Innis et al. |
| 2008/0109613 A1 | 5/2008 | Jarosh et al. |
| 2008/0112415 A1 | 5/2008 | Sobaje |
| 2008/0228871 A1 * | 9/2008 | Sano ............... 709/203 |
| 2008/0232374 A1 | 9/2008 | Kopelman et al. |
| 2008/0240111 A1 | 10/2008 | Gadelrab |
| 2008/0279208 A1 | 11/2008 | Walls et al. |
| 2009/0083392 A1 | 3/2009 | Wong et al. |
| 2009/0086733 A1 | 4/2009 | Barrack et al. |
| 2010/0118885 A1 | 5/2010 | Congdon |
| 2011/0072162 A1 | 3/2011 | Rysavy |
| 2011/0296063 A1 | 12/2011 | Pais et al. |
| 2012/0218890 A1 | 8/2012 | Gerkis |
| 2012/0219002 A1 | 8/2012 | Sobaje |
| 2012/0317360 A1 | 12/2012 | Zettler et al. |
| 2012/0331227 A1 | 12/2012 | Saripalli |
| 2014/0153575 A1 | 6/2014 | Munoz |

FOREIGN PATENT DOCUMENTS

| | | |
|---|---|---|
| CN | 1682502 A | 10/2005 |
| CN | 1922591 A | 2/2007 |
| JP | H05173953 A | 7/1993 |
| JP | H07202946 A | 8/1995 |
| JP | 2002278834 A | 9/2002 |
| JP | 2005018772 A | 1/2005 |
| JP | 2006513510 A | 4/2006 |

* cited by examiner

| Other info 304 | Buffer Physical Pointer 308 | Buffer Virtual pointer 312 | PNC Result 316 | Number_of_cache_line_A 320 | Address_offset 324 | Number_of_cache_line_B 328 |

300 ⟶

Pre-fetch command 318 (brace covering 320, 324, 328)

Fig. 3

PRE-FETCHING OF DATA PACKETS

CROSS REFERENCE TO RELATED APPLICATIONS

The present application claims priority to U.S. Patent Application No. 61/309,804, filed Mar. 2, 2010, the entire specification of which is hereby incorporated by reference in its entirety for all purposes, except for those sections, if any, that are inconsistent with this specification. The present application is related to U.S. patent application Ser. No. 12/947,678 (MP3444), filed Nov. 16, 2010, to U.S. patent application Ser. No. 13/038,279 (MP3599), filed Mar. 1, 2011, and to U.S. patent application Ser. No. 13/038,266 (MP3598), filed Mar. 1, 2011, the entire specifications of which are hereby incorporated by reference in their entirety for all purposes, except for those sections, if any, that are inconsistent with this specification.

TECHNICAL FIELD

Embodiments of the present disclosure relate to processing of data in general, and more specifically, to pre-fetching of data and/or data packets.

BACKGROUND

Unless otherwise indicated herein, the approaches described in this section are not prior art to the claims in the present disclosure and are not admitted to be prior art by inclusion in this section.

In systems for processing data, for example, packet processing systems for processing packets transmitted on a network, some parts of the processing, such as for example bridging decisions (e.g. layer 2), are suitable to be performed by a pipeline processor. Other types of processing, such as for example, routing (e.g., layer 3), identifying previously unknown flows of packets through a network switch and checking that selected packets do not contain malicious content, are performed by a central processing unit (CPU). In order to minimize latency when performing operations using the CPU, data that is needed by the CPU for processing is loaded from an external memory into a cache memory.

SUMMARY

In various embodiments, the present disclosure provides a method comprising receiving a data packet, and storing the received data packet in a memory; generating a descriptor for the data packet, the descriptor including information for fetching at least a portion of the data packet from the memory; and in advance of a processing core requesting the at least a portion of the data packet to execute a processing operation on the at least a portion of the data packet, fetching the at least a portion of the data packet to a cache based at least in part on information in the descriptor. There is also provided a system-on-chip (SOC) comprising a processing core; a cache; a packet processing module configured to generate a descriptor for a data packet, the descriptor including information for fetching a section of the data packet from a memory; and a packet descriptor based pre-fetch module configured to fetch and process the descriptor of the data packet, and fetch a the section of the data packet to the cache based at least in part on processing the descriptor of the data packet. There is also provided a method comprising receiving a data packet; parsing and classifying the data packet to generate classification information of the data packet; generating a descriptor of the data packet based at least in part on the classification information, the descriptor including an indication of a section of the data packet that is to be pre-fetched; queuing the descriptor in a descriptor queue.

BRIEF DESCRIPTION OF THE DRAWINGS

In the following detailed description, reference is made to the accompanying drawings which form a part hereof wherein like numerals designate like parts throughout, and in which is shown by way of embodiments that illustrate principles of the present disclosure. It is noted that other embodiments may be utilized and structural or logical changes may be made without departing from the scope of the present disclosure. Therefore, the following detailed description is not to be taken in a limiting sense, and the scope of embodiments in accordance with the present disclosure is defined by the appended claims and their equivalents.

FIG. 3 schematically illustrates an example structure of a descriptor of a data packet, in accordance with an embodiment of the present disclosure.

DETAILED DESCRIPTION

A data packet that is transferred over a network generally comprises a header section that precedes a payload section of the data packet. The header section includes, for example, information associated with an originating address, a destination address, a priority, a queue, a traffic flow, an application area, an associated protocol, and/or the like (e.g., any other configuration information), of the data packet. The payload section includes, for example, user data associated with the data packet, data that is intended to be transmitted over the network, such as for example, internet data, streaming media, etc.

Figure 1:
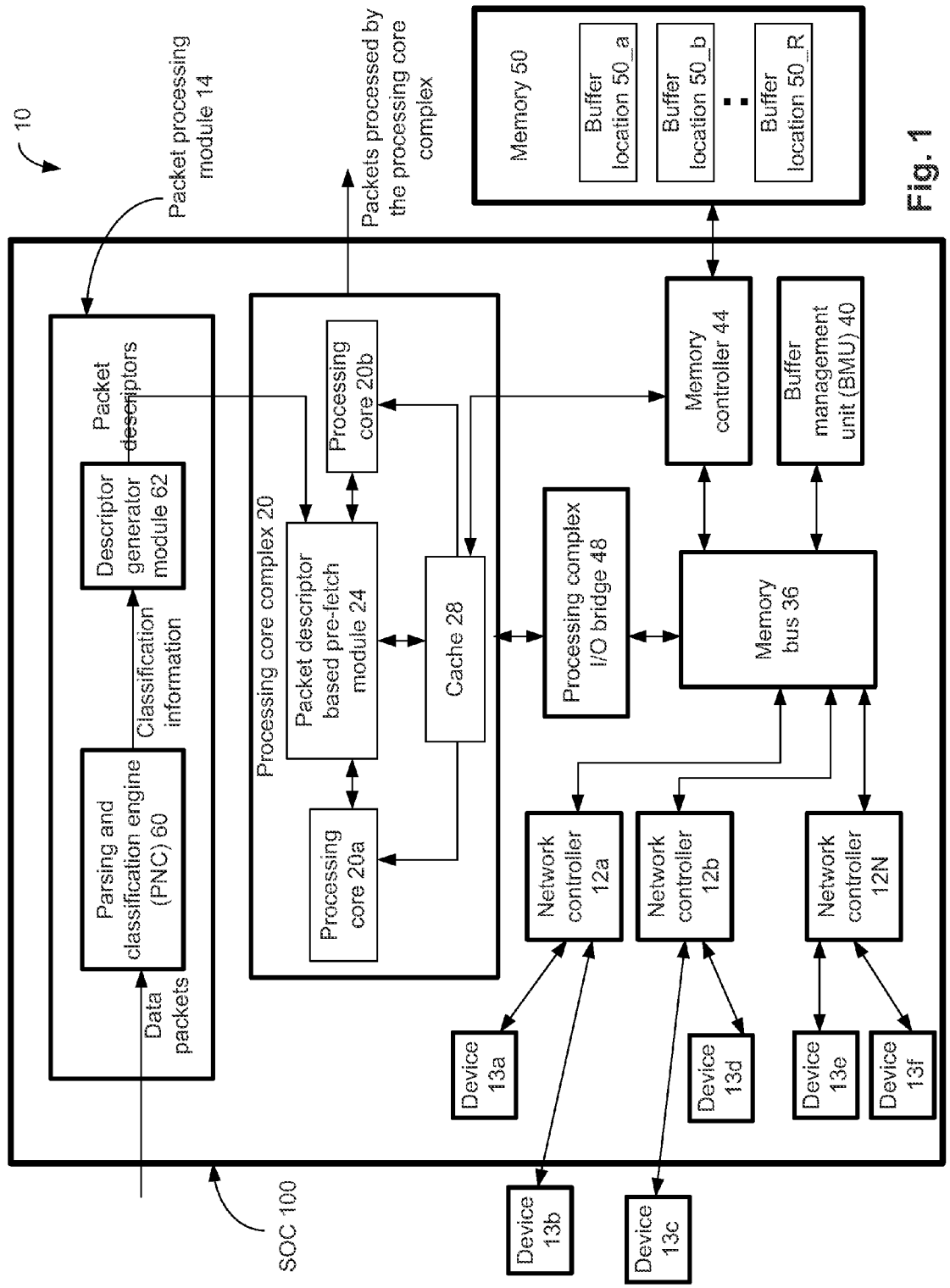
FIG. 1 schematically illustrates a packet communication system that includes a system-on-chip (SOC) comprising a pre-fetch module, in accordance with an embodiment of the present disclosure.

FIG. 1 schematically illustrates a packet communication system 10 (also referred to herein as system 10) that includes a system-on-chip (SOC) 100 comprising a packet descriptor based pre-fetch module 24, in accordance with an embodiment of the present disclosure. The SOC 100 includes a processing core complex 20, which comprises processing cores 20a and 20b, the packet descriptor based pre-fetch module 24, and a cache 28. In an embodiment, the cache 28 is, for example, a level 2 (L2) cache, which is shared by the cores 20a and 20b. Although two processing cores are illustrated to be included in the processing core complex 20, in an embodiment, any other suitable number of processing cores (e.g., one, three, four, or the like) can be included in the processing core complex 20. Although not illustrated in FIG. 1, one or both of the processing cores 20a and 20b include a level 1 (L1) cache.

The SOC 100 also includes a memory bus 36 that is operatively coupled to a memory 50 through a memory controller 44. The memory controller 44 is operatively coupled to and configured to control the memory 50. In an embodiment, the memory controller 44 is configured to receive read instructions and/or write instructions for the memory 50 from the one or more components (e.g., from a network controller 12a, which will be discussed in more detail herein later) via the memory bus 36, and translate the received instructions in a format that is compatible to the memory 50. That is, the memory controller 44 acts as an interface between the memory 50 and various other components of the system 100 (e.g., through the memory bus 36). As illustrated in FIG. 1, in an embodiment, the memory 50 is external to the SOC 10, although in other embodiments, the memory 50 is internal to the SOC 10. In an embodiment, the memory 50 is a dynamic random access memory (DRAM) (e.g., a double-data-rate three (DDR3) synchronous dynamic random access memory (SDRAM)).

In an embodiment, the memory 50 includes a plurality of buffer locations, e.g., buffer locations 50_a, 50_b, ..., 50_R, where R is an appropriate positive integer. Each of the buffer locations 50_a, 50_b, ..., 50_R is configured to buffer one or more bytes of data. For example, each of the buffer locations is configured to store one or more data packets (or a part of a data packet). In an embodiment, one or more of the illustrated buffer locations are contiguous buffer locations in the memory 50.

One or more components of the processing core complex 20 (e.g., the processing cores 20a and 20b, packet descriptor based pre-fetch module 24, and/or the cache 28) are operatively coupled to the memory bus 36 through a processing complex Input/Output (I/O) bridge 48. In an embodiment, one or more components of the processing core complex 20 read from, and/or write to the memory 50 through the processing complex I/O bridge 48, the memory bus 36, and the memory controller 44. In an embodiment, the cache 28 is configured to access the memory 50 through the memory controller 44, bypassing the processing core complex I/O bridge 48.

The SOC 100 also includes N number of network controllers 12a, 12b, ..., 12N, where N is an appropriate integer. Although the network controllers 12a, ..., 12N are illustrated in FIG. 1 to be internal to the SOC 100, in an embodiment, one or more of the network controllers 12a, ..., 12N can be external to the SOC 100. In an embodiment, one or more of the network controllers 12a, 12b, ..., 12N control flow of data packets in the system 10. For example, one or more of the network controllers 12a, ..., 12N trans-receives (e.g., transmits and/or receives) data packets to and/or from a plurality of devices. For example, network controller 12a trans-receives data packets to and/or from devices 13a and/or 13b, network controller 12b trans-receives data packets to and/or from devices 13c and/or 13d, and network controller 12c trans-receives data packets to and/or from devices 13e and/or 13f. The devices (e.g., devices 13a, ..., 13f), from which the network controllers 12a, ..., 12N trans-receives data packets, are, for example, network routers, network ports, Ethernet ports (e.g., a Gigabyte Ethernet ports), any other appropriate devices that have network connectivity, and/or the like. In an embodiment, one or more of the devices 13a, ..., 13f are network switches used for switching data packets in the system 100. In an embodiment, one or more of the devices 13a, ..., 13f are included in the SOC 100, while another one or more of the devices 13a, ..., 13f are external to the SOC 100. For example, as illustrated in FIG. 1, devices 13b and 13c are external to the SOC 100, while devices 13a, 13d, 13e and 13f are included in the SOC 100.

The SOC 100 further includes a packet processing module 14 that comprises a parsing and classification engine (PNC) 60 and a descriptor generator module 62. The PNC 60 receives one or more data packets (or at least a section of the data packets) from one or more components of the system 100 (e.g., receives a flow of data packets from one or more components). For example, the PNC 60 receives data packets from components that are internal to the SOC 100, and/or are external to the SOC 100. In an embodiment, PNC 60 receives a portion of a data packet that is transmitted over a network. The PNC 60 parses and classifies the data packets to generate classification information of the data packets. For example, the PNC 60 parses a data packet in accordance with a set of predefined network protocols and rules that, in aggregate, define an encapsulation structure of the data packet. In an example, a classification information of a data packet includes information associated with a type, a priority, a destination address, a queue address, and/or the like, of the data packet. The PNC 60 in accordance with an embodiment is described in a copending application (MP3444) U.S. Ser. No. 12/947,678 (entitled "Iterative Parsing and Classification"), the specification of which is hereby incorporated by reference in its entirety, except for those sections, if any, that are inconsistent with this specification. In another embodiment, instead of the PNC 60, any other suitable hardware and/or software component may be used for parsing and classifying data packets.

In an embodiment, the descriptor generator module 62 receives the classification information of a data packet from the PNC 60, and generates a descriptor for the data packet based at least in part on the classification information, as will be discussed in more detail herein later. In an embodiment and although not illustrated in FIG. 1, the PNC 60 generates the descriptors of various data packets, i.e., the descriptor generator module is a part of the PNC 60.

In an embodiment, the SOC 100 also includes a buffer management unit (BMU) 40 for allocating buffer locations to one or more components of the system 100, although in another embodiment buffer allocation is performed, for example, by the processing cores 20a and/or 20b, or by any appropriate software (in the another embodiment, the BMU 40 may be absent from the SOC 100). Although the SOC 100 includes several other components (e.g., a communication bus, one or more peripherals, interfaces, and/or the like), these components are not illustrated in FIG. 1 for purposes of illustrative clarity.

In an embodiment and as will be discussed in more detail herein later, the packet descriptor based pre-fetch module 24 executes a process that uses a descriptor generated for a data packet (e.g., by the descriptor generator module 62) that is buffered in one of the memory locations in the memory 50. In an embodiment, the descriptor includes an indication of a relevant section of the data packet, for example a relevant part of the packet header, that is to be pre-fetched and stored in the cache 28 (however other parts of the packet may also be indicated such as, for example, parts of the payload that are required for a deep packet inspection to prevent malicious intrusion). The packet descriptor based pre-fetch module 24 pre-fetches the section of the data packet to the cache 28, based at least in part on the processing of the descriptor of the data packet. One of the processing cores 20a and 20b then accesses and processes the pre-fetched and stored section of the data packet from the cache 28.

Figure 2:
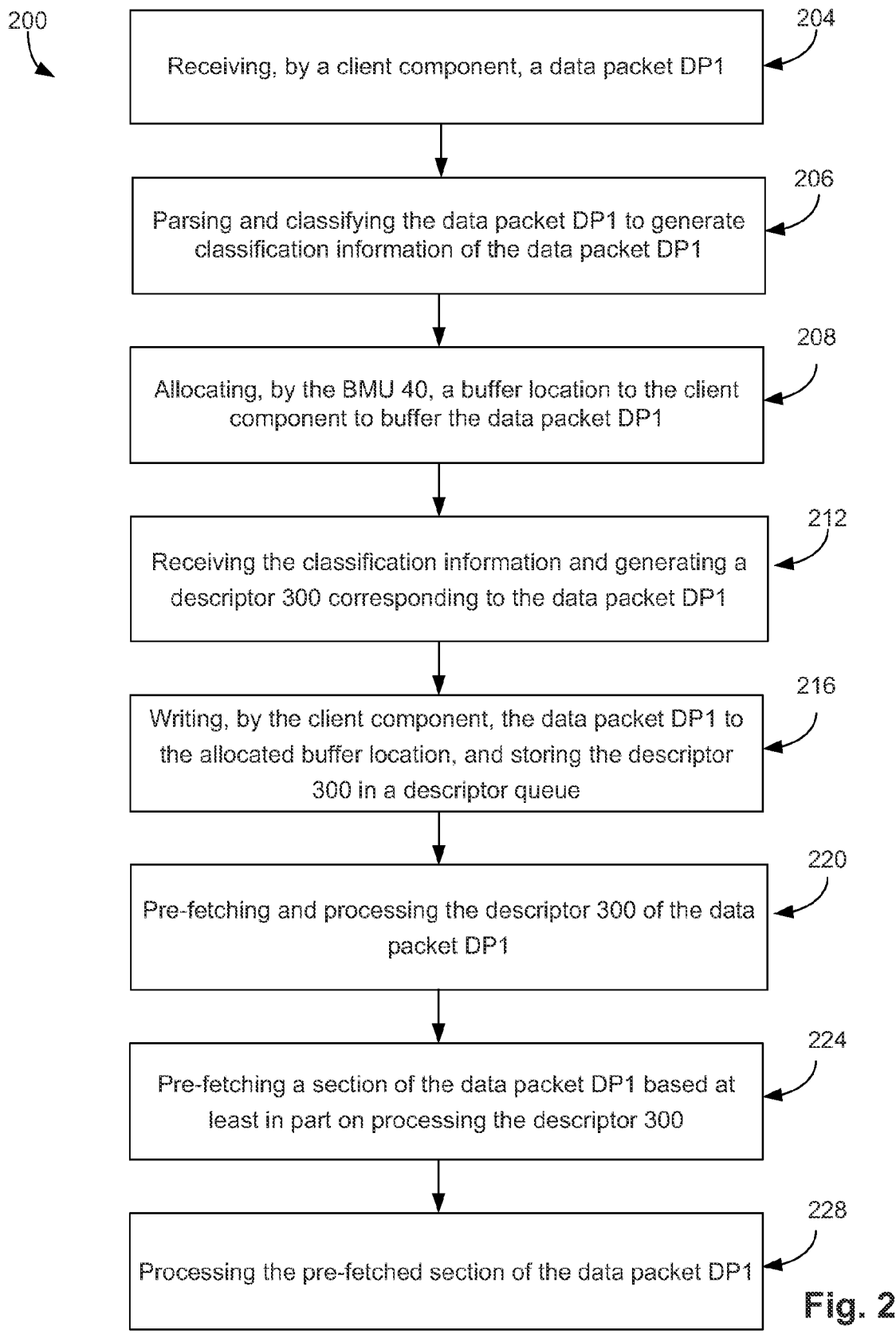
FIG. 2 illustrates an example method for operating the packet communication system of FIG. 1, in accordance with an embodiment of the present disclosure.

FIG. 2 illustrates an example method 200 for operating the system 10 of FIG. 1, in accordance with an embodiment of the present disclosure. Also, FIG. 3 schematically illustrates an example structure of a descriptor 300 of a data packet DP1 generated during operations of the method 200, in accordance with an embodiment of the present disclosure.

Referring to FIG. 2, in an embodiment, the BMU 40 provides service to one or more of the network controllers 12a, ..., 12N and/or the processing cores 20a, 20b, and accordingly, these components (i.e., one or more of the network controllers 12a, ..., 12N and/or the processing cores 20a, 20b) are referred to herein as client components of the BMU 40. Referring again to FIGS. 1 and 2, at 204 of the method 200, a client component receives the data packet DP1. For example, the network controller 12a, which is an example client component, receives the data packet DP1 from device 13a or 13b. In response to receiving the data packet DP1, the client component transmits a buffer allocation request to the BMU 40. In another embodiment, instead of the BMU 40 receiving and/or processing the buffer allocation requests, a software (e.g., associated with the processing cores 20a and/or 20b) receives and/or processes the buffer allocation requests. The BMU 40 in accordance with an embodiment is described in a copending application U.S. Ser. No. 13/038, 266, which is based on U.S. provisional applications 61/615, 327 filed on Mar. 18, 2010 and 61/347,947 filed on May 25, 2010, the specifications of which are hereby incorporated by reference in their entirety, except for those sections, if any, that are inconsistent with this instant specification. In an embodiment, the PNC 60 receives a data packet DP1 (or at least a section of the data packet DP1, e.g., a header section of the data packet DP1) from the client component (although, for purposes of illustrative clarity, FIG. 1 does not illustrate the flow of the data packet DP1 from the client component to the PNC 60). At 206 of the method 200, the PNC 60 parses and classifies the data packet DP1 to generate classification information of the data packet DP1.

At 208 of the method 200, the BMU 40 allocates a buffer location to the client component to buffer (e.g., store) the data packet DP1, in response to the BMU 40 receiving the buffer allocation request from the client component. For example, in response to a first client component (e.g., the network controller 12a) receiving a first data packet, the BMU 40 allocates buffer location 50_a to the first client component to buffer the first data packet. In another example, in response to a second client component (e.g., the processing core 20a) receiving a second data packet, the BMU 40 allocates buffer location 50_b to the second client component to buffer the second data packet. In various other embodiments, an appropriate software (e.g., instead of the BMU 40) allocates buffer locations to client components to buffer the data packet DP1, e.g., by adding a physical address of the allocated buffer to a descriptor of the data packet.

At 212 of the method 200, the descriptor generator module 62 receives the classification information of the data packet DP1 from the PNC 60, and generates a descriptor (e.g., descriptor 300 which is described in greater detail below with reference to FIG. 3) of the data packet DP1 based at least in part on the classification information. In an embodiment, operations at 212 can be performed simultaneously, or prior to, the operations at 208 (i.e., the descriptor 300 can be generated along with, or prior to, the allocation of the buffer location to the client component). In another embodiment and although not illustrated in FIG. 1, the descriptor generator module 62 can be with integrated in the PNC 60, such that the PNC 60 generates the descriptor. In yet another embodiment and although not illustrated in FIG. 1, the PNC 60 provides the classification information to the client device, which generates the descriptor (i.e., the client component acts as a descriptor generator, and a separate descriptor generator is not present in the SOC 100).

Referring again to FIG. 3, the descriptor 300 is generated at 212 of the method 200, based at least in part on classification information generated by the PNC 60 for the data packet DP1. In an embodiment, the descriptor 300 is, for example, 32 bytes long and comprises a plurality of fields, including a buffer physical pointer 308, buffer virtual pointer 312, parsing and classification (PNC) result 316, a pre-fetch command portion 318, and/or one or more other fields (generally illustrated as other info 304). Although various fields of the descriptor 300 are illustrated in a particular order in FIG. 3 (e.g., buffer physical pointer 308 located after buffer virtual pointer 312, etc.), such an ordering is only an example and is not limiting on the teachings of this disclosure.

The buffer physical pointer 308 and the buffer virtual pointer 312 are a physical address pointer and a virtual address pointer, respectively, of a buffer location (e.g., buffer location 50_a) in the memory 50 that has been allocated for buffering the data packet DP1. The PNC result 316 includes parsing and/or classification information generated by the PNC 60 based at least in part on parsing and/or classifying the data packet DP1. In an embodiment, the pre-fetch command 318 further comprises various fields, e.g., a number_of_cache_line_A 320, address_offset 324, and number_of_cache_line_B 328, which will be discussed in more detail herein later.

Referring again to FIG. 2, in an embodiment, once a buffer location is allocated to the client component, at 216 of the method 200, the client component writes (e.g., writes through the memory bus 36 and the memory controller 44) the data packet DP1 to the allocated buffer location. Also, at 216, the descriptor 300 of the data packet is written (e.g., by the descriptor generator module 62) to a descriptor queue. In an embodiment, the descriptor queue is maintained by the descriptor generator module 62, and the packet descriptor based pre-fetch module 24 receives the descriptors from the descriptor generator module 62. In various other embodiments (and not illustrated in FIG. 1), the descriptor queue is stored in any appropriate storage location, e.g., the memory 50, cache 28, an internal memory (not illustrated in FIG. 1) included in the BMU 40, and/or other suitable location, from where the packet descriptor based pre-fetch module 24 receives the descriptors.

At 220 of the method 200, the packet descriptor based pre-fetch module 24 pre-fetches the descriptor 300 of the data packet DP1 from the descriptor queue. The packet descriptor based pre-fetch module 24 pre-fetches the descriptor 300 of the data packet DP1 while one of the processing cores (e.g., processing core 20a) is processing another data packet. In an example, the data packet DP1 is a second data packet DP1, where a first data packet DP0 and the second data packet DP1 is associated with a first traffic flow that is processed by the processing core 20a. In an embodiment, the packet descriptor based pre-fetch module 24 pre-fetches the descriptor 300 of the second data packet DP1 while the processing core 20a process the first data packet DP0. Such pre-fetching of the descriptor 300 of the second data packet DP1 is performed by anticipating that the processing core 20a will most probably want to process the second data packet DP1, after completing processing of the first data packet DP0. In another embodiment, the pre-fetching operation at 220 can be based on any other suitable criterion. In an embodiment, the packet descriptor based pre-fetch module 24 pre-fetches the descriptor 300 and stores the pre-fetched descriptor 300 in the cache 28, although in another embodiment, the packet descriptor based pre-fetch module 24 does not store the pre-fetched descriptor 300 (e.g., directly process the descriptor 300, without storing the descriptor 300).

At 220 of the method 200, the packet descriptor based pre-fetch module 24 also processes the pre-fetched descriptor 300. For example, the packet descriptor based pre-fetch module 24 reads, among other fields, the buffer physical pointer 308 and the pre-fetch command 318 from the descriptor 300.

At 224 of the method 200, the packet descriptor based pre-fetch module 24 pre-fetches a relevant section of the data packet DP1 (e.g., a section of the data packet that is relevant while processing the data packet by a processing core), from the memory 50 to the cache 28, based at least in part on processing the descriptor 300. For example, buffer physical pointer 308 of the descriptor 300 is a physical address pointer of a buffer location (e.g., buffer location 50_a) in the memory 50 that was allocated (e.g., allocated at 208 of method 200) for buffering the data packet DP1. In an embodiment, the pre-fetch command 318 of the descriptor 300 includes an indication of the relevant section of the data packet DP1 (e.g., instead of the entire data packet DP1) that is to be pre-fetched (e.g., pre-fetched at 224) by the packet descriptor based pre-fetch module 24 to the cache. While processing the descriptor 300 at 220, the packet descriptor based pre-fetch module 24 reads the buffer physical pointer 308 and the pre-fetch command 318 from the descriptor 300. Subsequently, the pre-fetching operation of the relevant section of the data packet DP1, at 224, is performed based on the buffer physical pointer 308 and the pre-fetch command 318.

For example, the processing core 20a processes only a header section of a data packet that is associated with a network routing application (and subsequently, if necessary, processes the entire data packet, based on processing the header section). On the other hand, the processing core 20a processes both a header section and a payload section of a data packet that is associated with a security related application. In an embodiment, while classifying the data packet DP1, the PNC 60 is aware of a type of application (e.g., a network routing application, a security related application, or the like) the data packet DP1 is associated with. Accordingly, the descriptor 300 (e.g., the pre-fetch command 318) indicates a relevant section of the data packet DP1 that is to be pre-fetched by the packet descriptor based pre-fetch module 24 at 224 of method 200. For example, if the data packet DP1 is associated with a network routing application, the descriptor 300 (e.g., the pre-fetch command 318 of the descriptor 300) is configured such that the packet descriptor based pre-fetch module 24 pre-fetches only a header section (but not the payload section) of the data packet. On the other hand, if the data packet DP1 is associated with a security related application, the descriptor 300 (e.g., the pre-fetch command 318 of the descriptor 300) is configured such that the packet descriptor based pre-fetch module 24 pre-fetches both the header section and the payload section of the data packet DP1.

In another embodiment, the section of the data packet DP1, which is pre-fetched at 224, is based at least in part on a priority associated with the data packet DP1. For example, the processing core 20a processes only a header section of a data packet that is associated with a relatively low priority application (and subsequently, if necessary, processes the entire data packet, based on processing the header section). On the other hand, the processing core 20a processes both a header section and a payload section of a data packet that is associated with a relatively high priority (e.g., time sensitive application, e.g., packets associated with Voice over Internet Protocol (VOIP) applications). Accordingly, for a relatively low priority data packet, the descriptor 300 of the data packet DP1 is configured such that only a header section is pre-fetched at 224. On the other hand, if the data packet DP1 is associated with a relatively high priority application, the descriptor 300 (e.g., the pre-fetch command 318 of the descriptor 300) is configured such that both the header and the payload section are pre-fetched at 224.

In yet other examples, the packet descriptor based pre-fetch module 24 pre-fetches the relevant section of the data packet 300 based at least in part on any other suitable criterion, e.g., any other configuration information output by the PNC 60.

Referring again to FIG. 3, in an embodiment, the buffer physical pointer 308 of the descriptor 300 is a start address (referred to herein as buffer address BPP) of the buffer location that was allocated for buffering the data packet DP1. In an embodiment, the number_of_cache_line_A 320, included in the pre-fetch command 318, indicates a number of sequential cache-lines (referred to herein as CL_A) to be pre-fetched (e.g., pre-fetched at 224 of method 200) from the buffer location, starting from the start address indicated in the buffer physical pointer 308. The address_offset 324 indicates an offset in the buffer location (referred to herein as ADDR_OFF), which is to be skipped while pre-fetching the section of the data packet DP1. The number_of_cache_line_B 328 indicates a number of sequential cache-lines (referred to herein as CL_B) to be pre-fetched (e.g., pre-fetched at 224 of method 200) from buffer address that starts from buffer address BPP+ADDR_OFF. A total of (CL_A+CL_B) number of cache lines of the data packet DP1 is pre-fetched at 224, where the CL_A lines are fetched from buffer address that starts with BPP, and where the CL_B lines are fetched from buffer address that starts with (BPP+ADDR_OFF).

In a simple example, if the buffer physical pointer 308 of the descriptor 300 is 120 (i.e., BPP=120), the number_of_cache_line_A 320 is 2 (i.e., CL_A=2), the address_offset 324 is 8 (i.e., ADDR_OFF=8), and the number_of_cache_line_B 328 is 3 (i.e., CL_B=3), then lines $120^{th}$, $121^{st}$, $128^{th}$, $129^{th}$, and $130^{th}$ cache lines are pre-fetched from the memory 50, by the packet descriptor based pre-fetch module 24, to the cache 28 at 224 of the method 200. In another example, the descriptor 300 includes more than one address_offset (e.g., address_offset_1, address_offset_2 and so on), with corresponding more than one number of cache_line (e.g., number of cache_line_1, number_of_cache_line_2 and so on).

Referring again to FIG. 2, at 228 of the method 200, a processing core (processing core 20a) accesses the pre-fetched section of the data packet DP1 from the cache 28, and processes the pre-fetched section of the data packet DP1.

Figure 4:
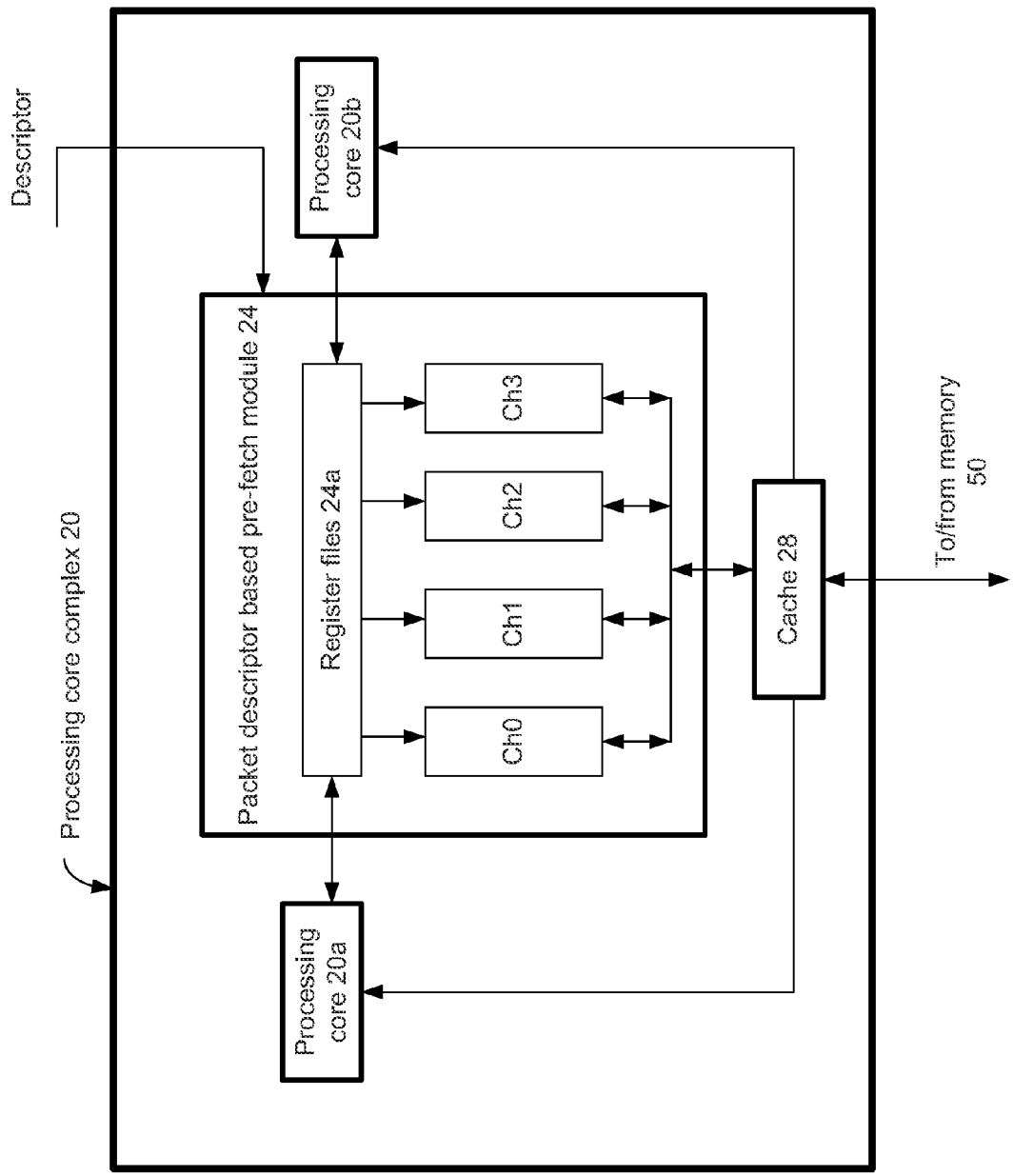
FIG. 4 schematically illustrates a processing core complex, including the pre-fetch module of FIG. 1, in more detail, in accordance with an embodiment of the present disclosure.

FIG. 4 schematically illustrates the processing core complex 20, including the packet descriptor based pre-fetch module 24 of FIG. 1, in more detail, in accordance with an embodiment of the present disclosure. The packet descriptor based pre-fetch module 24 includes register files 24a operatively coupled to the processing cores 20a and/or 20b. In an embodiment, the register files 24a receive information from the processing core(s) regarding the data packet(s) that the processing core(s) are currently processing. Based on this information, the packet descriptor based pre-fetch module 24 pre-fetches descriptors of one or more data packets, and/or sections of the one or more data packets.

In the embodiment seen in FIG. 4, the packet descriptor based pre-fetch module 24 includes four channels-channel 0, channel 1, channel 2, and channel 3, although in another embodiment, the packet descriptor based pre-fetch module 24 can include any other suitable number of channels. In an embodiment, a channel is associated with, for example, a respective traffic flow, a respective traffic queue, a respective processing core, and/or the like. In various other embodiments, any other suitable criteria can be used to allocate a channel of the pre-fetch engine 24.

In an example, the processing core 20a is configured to process data packets associated with a first traffic flow and a second traffic flow, and the processing core 20b is configured to process data packets associated with a third traffic flow and a fourth traffic flow. In an embodiment, the first traffic flow, for example, is configured to handle network routing related data packets received from the network controller 12b. Channel 0 of the pre-fetch engine 24 is configured to handle, for example, data packets associated with the first traffic flow of the processing core 20a. Similarly, channel 1 of the pre-fetch engine 24 can be configured to handle, for example, data packets associated with the second traffic flow of the processing core 20a, and so on. In various other embodiments, for example, a channel (e.g., channel 0) handles more than one traffic flow (e.g., handles both the first and second traffic flows).

In an embodiment, descriptors associated with data packets of the first traffic flow are consecutively queued (e.g., based on a first-in first-out basis) in a first descriptor queue. The channel 0 of the pre-fetch engine 24 sequentially pre-fetches descriptors from the first descriptor queue, and sequentially pre-fetches the associated data packets (e.g., sections of the data packets) based on pre-fetching the respective descriptors. Similarly, channel 1 pre-fetches descriptors of data packets from a second descriptor queue, where the second descriptor queue is associated with data packets of the second traffic flow.

In an embodiment, the various channels of the packet descriptor based pre-fetch module 24 operate in parallel, i.e., simultaneously. For example, while channel 0 pre-fetches descriptors and/or sections of data packets associated with the first traffic flow, channel 1 pre-fetches descriptors and/or sections of data packets associated with the second traffic flow.

Although FIG. 1 illustrates the PNC 60, in an embodiment, the PNC 60 is not included in the SOC 100. In such alternative embodiment, the descriptor is generated by the associated client component (e.g., the client component from which the data packet is received) and/or by one of the processing cores 20a and 20b. For example, in the absence of the PNC 60, the processing core 20a parses and classifies a data packet, generates an associated descriptor, and stores the descriptor in a descriptor queue. The packet descriptor based pre-fetch module 24 pre-fetches and processes the generated descriptor, based on which the packet descriptor based pre-fetch module 24 pre-fetches a section of a data packet, or the entire data packet.

Including a pre-fetch command in a descriptor of a data packet, and pre-fetching a section of the data packet (e.g., instead of pre-fetching the entire data packet) in the cache 28 has several advantages. For example, the section of the data packet, which a processing core (e.g., processing core 20a and/or 20b) accesses while processing the data packet, is pre-fetched in the cache 28. Thus, the section of the data packet is readily available to the processing core in the cache 28 whenever the processing core wants to access and/or process the section of the data packet, thereby decreasing a latency associated with reading the data packet. Also, as only a section of the data packet (e.g., instead of the entire data packet) is stored in the cache 28, the cache 28 is not overloaded with data (e.g., the cache 28 is not required to be frequently overwritten). This also results in a smaller sized cache, and/or decreases chances of dropping of data packets while writing the data packets in the cache 28. In addition, the timing of prefetching the data is triggered by the processing core complex 20 (instructing the prefetch channel to prefetch next few descriptors), so data is prefetched in adjacent to the timing of the processing core complex 20 processing of the data.

Furthermore, in the embodiment described, the generation and pre-fetching of the descriptors and prefetching of associated data packets (or portions of data packets) requires minimal involvement of the processing cores. Accordingly, in an embodiment the packet descriptor based pre-fetch module 24 relieves the processing cores from generating instructions for fetching (or pre-fetching) data packets, thereby saving processing power of the processing cores.

Figure 5:
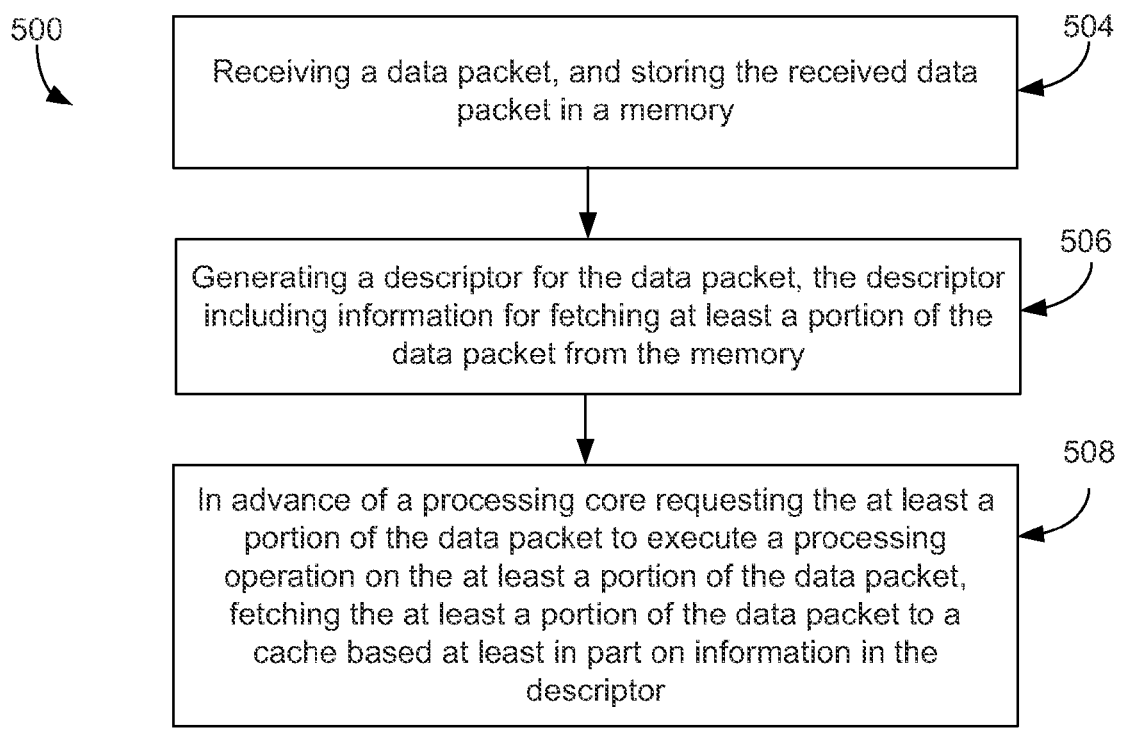
FIG. 5 illustrates another example method for operating the system of FIG. 1, in accordance with an embodiment of the present disclosure.

FIG. 5 illustrates an example method 500 for operating the system 10 of FIG. 1, in accordance with an embodiment of the present disclosure. At 504 of the method 500, a client component receives a data packet and stores the data packet in a memory (e.g., memory 50). As previously discussed, the PNC 60 also receives, for example, a section of the data packet. At 506, the PNC 60 generates a descriptor for the data packet, the descriptor including information for fetching at least a portion of the data packet from the memory. At 508, in advance of a processing core (e.g., processing core 20a) requesting the at least a portion of the data packet to execute a processing operation on the at least a portion of the data packet, the packet descriptor based pre-fetch module 24 fetches the at least a portion of the data packet to a cache (e.g., cache 28) based at least in part on information in the descriptor.

Although specific embodiments have been illustrated and described herein, it is noted that a wide variety of alternate and/or equivalent implementations may be substituted for the specific embodiment shown and described without departing from the scope of the present disclosure. The present disclosure covers all methods, apparatus, and articles of manufacture fairly falling within the scope of the appended claims either literally or under the doctrine of equivalents. This application is intended to cover any adaptations or variations of the embodiment disclosed herein. Therefore, it is manifested and intended that the present disclosure be limited only by the claims and the equivalents thereof.

What is claimed is:

1. A method comprising:
    receiving a data packet, and storing the received data packet in a memory;
    determining one or both of (i) a type of application with which the data packet is associated, and (ii) a priority associated with the data packet;
    generating a descriptor for the data packet, the descriptor including information for fetching at least a portion of the data packet from the memory, wherein the at least a portion of the data packet to be fetched is based on the determined one or both of (i) the type of application with which the data packet is associated, and (ii) the priority associated with the data packet, and wherein the at least a portion of the data packet is less than an entirety of the data packet; and
    in advance of a processing core requesting the at least a portion of the data packet to execute a processing operation on the at least a portion of the data packet, fetching the at least a portion of the data packet to a cache based at least in part on information in the descriptor.

2. A method comprising:
    receiving a data packet, and storing the received data packet in a memory;
    generating a descriptor for the data packet, the descriptor including information associated with a characteristic of the data packet;
    based on the information associated with the characteristic of the data packet included in the descriptor, identifying a first portion of the data packet, wherein the first portion of the data packet does not comprise an entirety of the data packet; and in advance of a processing core requesting the data packet to execute a processing operation on the data packet, fetching the first portion of the data packet to the cache.

3. The method of claim 2, wherein generating the descriptor is performed in a packet processing module that is separate from the processing core.

4. The method of claim 2, further comprising:
processing the descriptor of the data packet to identify the first portion of the data packet that is to be fetched.

5. The method of claim 2, further comprising
processing the descriptor of the data packet to determine a memory location from which the first portion of the data packet is to be fetched.

6. The method of claim 2, wherein the data packet is a first data packet, wherein the first data packet is associated with a first traffic flow, and wherein said fetching the first portion of the first data packet further comprises:
pre-fetching, while processing a second data packet associated with the first traffic flow, the first portion of the first data packet from the memory to the cache based at least in part on the first data packet and the second data packet being associated with the same traffic flow.

7. The method of claim 2, wherein the data packet comprises the first portion and a second portion, and wherein the method further comprises:
refraining from fetching the second portion of the data packet to the cache while fetching the first portion of the data packet, based at least in part on information in the descriptor.

8. The method of claim 2, wherein the descriptor is a first descriptor, the data packet is a first data packet, and wherein said fetching the first portion of the first data packet further comprises:
generating a second descriptor for a second data packet that is received and stored in the memory; and
fetching the first portion of the first data packet subsequent to fetching at least a portion of the second data packet, based at least in part on the second descriptor and the first descriptor being two consecutive descriptors in a descriptor queue.

9. The method of claim 2, further comprising:
accessing, by the processing core, the first portion of the data packet from the cache; and
processing, by the processing core, the accessed first portion of the data packet.

10. The method of claim 2, further comprising:
pre-fetching and processing the descriptor; and
fetching the first portion of the data packet, based at least in part on said processing the descriptor.

11. The method of claim 2, wherein said generating the descriptor further comprises:
generating the descriptor such that the descriptor includes an address of a memory location in which the data packet is stored.

12. A system-on-chip (SOC) comprising:
a processing core;
a cache;
a packet processing module configured to generate a descriptor for a data packet, the descriptor including information for fetching a section of the data packet from a memory, wherein a section of the data packet to be fetched is less than an entirety of the data packet, and wherein the section of the data packet to be fetched is based on one or both of (i) a type of application with which the data packet is associated, and (ii) a priority associated with the data packet; and a packet descriptor based pre-fetch module configured to:
fetch and process the descriptor of the data packet, and
fetch the section of the data packet to the cache based at least in part on processing the descriptor of the data packet.

13. The SOC of claim 12, wherein the processing core is configured to:
access the fetched section of the data packet from the cache, and
process the accessed section of the data packet.

14. The SOC of claim 12, wherein the packet descriptor based pre-fetch module is further configured to fetch the section of the data packet from a memory that is external to the SOC.

15. The SOC of claim 12, wherein the descriptor includes an indication of a memory location from where the data packet is to be fetched, and also includes an indication of the section of the data packet that is to be fetched.

16. The SOC of claim 12, wherein:
the data packet is a first data packet;
the first data packet is associated with a first traffic flow; and
the packet descriptor based pre-fetch module is further configured to pre-fetch, while processing a second data packet associated with the first traffic flow, the section of the first data packet from a memory to the cache based at least in part on the first data packet and the second data packet being associated with the same traffic flow.

17. The SOC of claim 12, wherein the packet processing module further comprises:
a parsing and classification engine to receive the data packet and generate classification information of the data packet; and
a descriptor generator module configured to generate the descriptor based at least in part on the classification information.

18. A method comprising:
receiving a data packet, and storing the received data packet in a memory;
determining one or both of (i) a type of application with which the data packet is associated, and (ii) a priority associated with the data packet;
generating a descriptor for the data packet, the descriptor including information for fetching at least a portion of the data packet from the memory, wherein the at least a portion of the data packet to be fetched is based on the determined one or both of (i) the type of application with which the data packet is associated, and (ii) the priority associated with the data packet; and
in advance of a processing core requesting the at least a portion of the data packet to execute a processing operation on the at least a portion of the data packet, fetching the at least a portion of the data packet to a cache based at least in part on information in the descriptor,
wherein generating the descriptor further comprises:
determining that the data packet is associated with a routing application; and
generating the descriptor such that the descriptor includes information for fetching a header section of the data packet, based on determining that the data packet is associated with the routing application, and
wherein said fetching the at least a portion of the data packet further comprises fetching the header section of the data packet, based on the descriptor.

19. A method comprising:
receiving a data packet, and storing the received data packet in a memory;
determining one or both of (i) a type of application with which the data packet is associated, and (ii) a priority associated with the data packet;
generating a descriptor for the data packet, the descriptor including information for fetching at least a portion of the data packet from the memory, wherein the at least a portion of the data packet to be fetched is based on the determined one or both of (i) the type of application with which the data packet is associated, and (ii) the priority associated with the data packet; and
in advance of a processing core requesting the at least a portion of the data packet to execute a processing operation on the at least a portion of the data packet, fetching the at least a portion of the data packet to a cache based at least in part on information in the descriptor,
wherein generating the descriptor further comprises:
determining that the data packet is associated with a security application; and
generating the descriptor such that the descriptor includes information for fetching a header section and a payload section of the data packet, based on determining that the data packet is associated with the security application, and
wherein said fetching the at least a portion of the data packet further comprises fetching the header section and the payload section of the data packet, based on the descriptor.

* * * * *